(12) United States Patent
Voss et al.

(10) Patent No.: US 6,747,808 B2
(45) Date of Patent: Jun. 8, 2004

(54) ELECTRONIC IMAGING DEVICE FOCUSING

(75) Inventors: James S. Voss, Fort Collins, CO (US); William R. Voss, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/264,669

(22) Filed: Oct. 4, 2002

(65) Prior Publication Data

US 2004/0066563 A1 Apr. 8, 2004

(51) Int. Cl.[7] .......................... G02B 15/14; H04N 15/00
(52) U.S. Cl. ......................................... 359/698; 348/45
(58) Field of Search ................. 359/698; 348/345–357; 396/95

(56) References Cited

U.S. PATENT DOCUMENTS

| | | | | |
|---|---|---|---|---|
| 4,814,889 A | * | 3/1989 | Covey .......................... 348/351 |
| 5,668,597 A | * | 9/1997 | Parulski et al. ............. 348/350 |

OTHER PUBLICATIONS

"A Comparison of Different Autofocus Algorithms," Proc. of IEEE International Conference on Pattern Recognition, pp. 597–600, 1982, by Guido Ligthart and Frans C.A. Groen.

"Implementation of a Passive Automatic Focusing Algorithm for Digital Still Camera," IEEE Trans. on Consumer Electronics, pp. 449–454, Aug. 1995, by Je–Ho Lee et al.

"Focusing*," International Journal of Computer Vision, vol. 1, No. 3, Oct. 1987, pp. 223–237, by Eric Krotkov.

"Focusing Techniques," Proceedings SPIE, Boston, Massachusetts, vol. 1823, pp. 163–174, Nov. 1992, by Murali Subbarao, Tae Choi, and Arman Nikzad.

* cited by examiner

Primary Examiner—Georgia Epps
Assistant Examiner—M. Hasan

(57) ABSTRACT

An electronic imaging device that is focused by capturing data samples from a region of at least one photodetector while changing focus settings and analyzing the data samples to identify an optimum focus setting. The size of the regions from which the data samples are captured is reduced during focusing to reduce the amount of data to be processed.

24 Claims, 8 Drawing Sheets

FIG. 8A

| | A | B | C | D | E | F | G | H | I | J | K | L | M | N | O | P |
|---|---|---|---|---|---|---|---|---|---|---|---|---|---|---|---|---|
| 1 | 3 | 3 | 3 | 3 | 3 | 3 | 3 | 3 | 3 | 3 | 3 | 3 | 3 | 3 | 3 | 4 |
| 2 | 3 | 3 | 3 | 3 | 3 | 3 | 3 | 3 | 3 | 3 | 3 | 3 | 3 | 3 | 3 | 4 |
| 3 | 3 | 3 | 3 | 3 | 3 | 3 | 3 | 3 | 3 | 3 | 3 | 3 | 3 | 3 | 3 | 3 |
| 4 | 3 | 3 | 3 | 3 | 3 | 3 | 3 | 5 | 7 | 7 | 7 | 5 | 3 | 3 | 3 | 3 |
| 5 | 2 | 3 | 3 | 3 | 3 | 3 | 3 | 5 | 7 | 18 | 18 | 18 | 7 | 5 | 3 | 3 |
| 6 | 2 | 2 | 3 | 3 | 3 | 3 | 5 | 7 | 18 | 18 | 18 | 18 | 18 | 7 | 5 | 3 |
| 7 | 2 | 2 | 2 | 2 | 3 | 2 | 7 | 18 | 18 | 19 | 19 | 19 | 18 | 18 | 7 | 3 |
| 8 | 2 | 2 | 2 | 2 | 2 | 2 | 7 | 18 | 18 | 19 | 19 | 19 | 18 | 18 | 7 | 3 |
| 9 | 2 | 2 | 2 | 2 | 2 | 2 | 8 | 18 | 18 | 18 | 18 | 18 | 18 | 18 | 7 | 2 |
| 10 | 2 | 2 | 2 | 2 | 2 | 2 | 5 | 8 | 18 | 18 | 18 | 18 | 18 | 7 | 5 | 2 |
| 11 | 1 | 2 | 2 | 2 | 2 | 1 | 1 | 5 | 7 | 18 | 18 | 18 | 7 | 5 | 2 | 2 |
| 12 | 1 | 1 | 1 | 1 | 1 | 1 | 1 | 1 | 7 | 13 | 13 | 13 | 7 | 2 | 2 | 2 |
| 13 | 1 | 1 | 1 | 1 | 1 | 1 | 1 | 1 | 7 | 13 | 13 | 13 | 7 | 2 | 2 | 2 |
| 14 | 1 | 1 | 1 | 1 | 1 | 1 | 1 | 1 | 7 | 13 | 13 | 13 | 7 | 2 | 2 | 2 |
| 15 | 1 | 1 | 1 | 1 | 1 | 1 | 1 | 1 | 7 | 13 | 13 | 13 | 7 | 1 | 2 | 2 |
| 16 | 1 | 1 | 1 | 1 | 1 | 1 | 1 | 1 | 7 | 13 | 13 | 13 | 7 | 1 | 1 | 2 |

FIG. 8B

| | A | B | C | D | E | F | G | H | I | J | K | L | M | N | O | P |
|---|---|---|---|---|---|---|---|---|---|---|---|---|---|---|---|---|
| 1 | | | | | | | | | | | | | | | | |
| 2 | | 0 | 0 | 0 | 0 | 0 | 0 | 0 | 0 | 0 | 0 | 0 | 0 | 0 | 0 | |
| 3 | | 0 | 0 | 0 | 0 | 0 | 0 | 0 | 1 | 0 | 0 | 0 | 1 | 0 | 0 | |
| 4 | | 0 | 0 | 0 | 0 | 0 | 0 | 4 | 27 | 14 | 0 | 14 | 27 | 4 | 0 | |
| 5 | | 0 | 0 | 0 | 0 | 0 | 4 | 33 | 105 | 36 | 0 | 36 | 105 | 33 | 4 | |
| 6 | | 0 | 0 | 0 | 0 | 4 | 42 | 105 | 81 | 9 | 0 | 9 | 81 | 105 | 39 | |
| 7 | | 0 | 0 | 0 | 0 | 14 | 169 | 132 | 12 | 0 | 0 | 0 | 12 | 132 | 150 | |
| 8 | | 0 | 0 | 0 | 0 | 25 | 256 | 115 | 0 | 0 | 0 | 0 | 0 | 121 | 232 | |
| 9 | | 0 | 0 | 0 | 0 | 25 | 182 | 121 | 7 | 0 | 0 | 0 | 9 | 132 | 169 | |
| 10 | | 0 | 0 | 0 | 0 | 7 | 64 | 110 | 68 | 7 | 0 | 7 | 76 | 110 | 52 | |
| 11 | | 0 | 0 | 0 | 0 | 0 | 12 | 60 | 144 | 49 | 0 | 49 | 144 | 49 | 7 | |
| 12 | | 0 | 0 | 0 | 0 | 0 | 1 | 36 | 150 | 52 | 0 | 52 | 132 | 25 | 0 | |
| 13 | | 0 | 0 | 0 | 0 | 0 | 0 | 36 | 144 | 36 | 0 | 36 | 121 | 25 | 0 | |
| 14 | | 0 | 0 | 0 | 0 | 0 | 0 | 36 | 144 | 36 | 0 | 36 | 126 | 25 | 0 | |
| 15 | | 0 | 0 | 0 | 0 | 0 | 0 | 36 | 144 | 36 | 0 | 36 | 138 | 27 | 0 | |
| 16 | | | | | | | | | | | | | | | | |

FIG. 8C

|   | A | B | C | D | E | F | G | H | I | J | K | L | M | N | O | P |
|---|---|---|---|---|---|---|---|---|---|---|---|---|---|---|---|---|
| 1 | 3 | 3 | 3 | 3 | 3 | 3 | 3 | 3 | 3 | 3 | 3 | 3 | 3 | 3 | 3 | 4 |
| 2 | 3 | 3 | 3 | 3 | 3 | 3 | 3 | 3 | 3 | 3 | 3 | 3 | 3 | 3 | 3 | 4 |
| 3 | 3 | 3 | 3 | 3 | 3 | 3 | 3 | 3 | 3 | 3 | 3 | 3 | 3 | 3 | 3 | 3 |
| 4 | 3 | 3 | 3 | 3 | 3 | 3 | 3 | 3 | 3 | 3 | 3 | 3 | 3 | 3 | 3 | 3 |
| 5 | 2 | 3 | 3 | 3 | 3 | 3 | 3 | 3 | 3 | 18 | 18 | 18 | 3 | 3 | 3 | 3 |
| 6 | 2 | 2 | 3 | 3 | 3 | 3 | 3 | 3 | 18 | 18 | 18 | 18 | 18 | 3 | 3 | 3 |
| 7 | 2 | 2 | 2 | 2 | 3 | 2 | 3 | 18 | 18 | 19 | 19 | 19 | 18 | 18 | 3 | 3 |
| 8 | 2 | 2 | 2 | 2 | 2 | 2 | 2 | 18 | 18 | 19 | 19 | 19 | 18 | 18 | 3 | 3 |
| 9 | 2 | 2 | 2 | 2 | 2 | 2 | 2 | 18 | 18 | 18 | 18 | 18 | 18 | 18 | 3 | 2 |
| 10 | 2 | 2 | 2 | 2 | 2 | 2 | 1 | 1 | 18 | 18 | 18 | 18 | 18 | 2 | 2 | 2 |
| 11 | 1 | 2 | 2 | 2 | 2 | 1 | 1 | 1 | 1 | 18 | 18 | 18 | 2 | 2 | 2 | 2 |
| 12 | 1 | 1 | 1 | 1 | 1 | 1 | 1 | 1 | 1 | 13 | 13 | 13 | 2 | 2 | 2 | 2 |
| 13 | 1 | 1 | 1 | 1 | 1 | 1 | 1 | 1 | 1 | 13 | 13 | 13 | 2 | 2 | 2 | 2 |
| 14 | 1 | 1 | 1 | 1 | 1 | 1 | 1 | 1 | 1 | 13 | 13 | 13 | 2 | 2 | 2 | 2 |
| 15 | 1 | 1 | 1 | 1 | 1 | 1 | 1 | 1 | 7 | 13 | 13 | 13 | 7 | 1 | 2 | 2 |
| 16 | 1 | 1 | 1 | 1 | 1 | 1 | 1 | 1 | 7 | 13 | 13 | 13 | 7 | 1 | 1 | 2 |

FIG. 8D

|   | A | B | C | D | E | F | G | H | I | J | K | L | M | N | O | P |
|---|---|---|---|---|---|---|---|---|---|---|---|---|---|---|---|---|
| 1 |   |   |   |   |   |   |   |   |   |   |   |   |   |   |   |   |
| 2 |   | 0 | 0 | 0 | 0 | 0 | 0 | 0 | 0 | 0 | 0 | 0 | 0 | 0 |   |   |
| 3 |   | 0 | 0 | 0 | 0 | 0 | 0 | 0 | 0 | 0 | 0 | 0 | 0 | 0 |   |   |
| 4 |   | 0 | 0 | 0 | 0 | 0 | 0 | 14 | 14 | 0 | 14 | 14 | 0 | 0 |   |   |
| 5 |   | 0 | 0 | 0 | 0 | 0 | 14 | 126 | 56 | 0 | 56 | 126 | 14 | 0 |   |   |
| 6 |   | 0 | 0 | 0 | 0 | 0 | 16 | 126 | 132 | 16 | 0 | 16 | 132 | 126 | 14 |   |
| 7 |   | 0 | 0 | 0 | 0 | 0 | 144 | 232 | 20 | 0 | 0 | 0 | 20 | 225 | 126 |   |
| 8 |   | 0 | 0 | 0 | 0 | 0 | 256 | 248 | 0 | 0 | 0 | 0 | 0 | 225 | 232 |   |
| 9 |   | 0 | 0 | 0 | 0 | 0 | 132 | 264 | 20 | 0 | 0 | 0 | 18 | 232 | 138 |   |
| 10 |   | 0 | 0 | 0 | 0 | 0 | 12 | 156 | 162 | 18 | 0 | 16 | 144 | 138 | 16 |   |
| 11 |   | 0 | 0 | 0 | 0 | 0 | 0 | 18 | 248 | 132 | 0 | 115 | 217 | 16 | 0 |   |
| 12 |   | 0 | 0 | 0 | 0 | 0 | 0 | 0 | 175 | 175 | 0 | 150 | 150 | 0 | 0 |   |
| 13 |   | 0 | 0 | 0 | 0 | 0 | 0 | 0 | 144 | 144 | 0 | 121 | 121 | 0 | 0 |   |
| 14 |   | 0 | 0 | 0 | 0 | 0 | 0 | 0 | 144 | 144 | 0 | 121 | 126 | 0 | 0 |   |
| 15 |   | 0 | 0 | 0 | 0 | 0 | 0 | 0 | 144 | 144 | 0 | 126 | 138 | 0 | 0 |   |
| 16 |   |   |   |   |   |   |   |   |   |   |   |   |   |   |   |   |

FIG. 8E

| | A | B | C | D | E | F | G | H | I | J | K | L | M | N | O | P |
|---|---|---|---|---|---|---|---|---|---|---|---|---|---|---|---|---|
| 1 | | | | | | | | | | | | | | | | |
| 2 | | 0 | 0 | 0 | 0 | 0 | 0 | 0 | 0 | 0 | 0 | 0 | 0 | 0 | | |
| 3 | | 0 | 0 | 0 | 0 | 0 | 0 | 0 | 1 | 0 | 0 | 0 | 1 | 0 | 0 | |
| 4 | | 0 | 0 | 0 | 0 | 0 | 0 | 4 | 13 | 0 | 0 | 0 | 13 | 4 | 0 | |
| 5 | | 0 | 0 | 0 | 0 | 0 | 4 | 19 | 21 | 20 | 0 | 20 | 21 | 19 | 4 | |
| 6 | | 0 | 0 | 0 | 0 | 4 | 26 | 21 | 51 | 7 | 0 | 7 | 51 | 21 | 25 | |
| 7 | | 0 | 0 | 0 | 0 | 14 | 25 | 100 | 8 | 0 | 0 | 0 | 8 | 93 | 24 | |
| 8 | | 0 | 0 | 0 | 0 | 25 | 0 | 133 | 0 | 0 | 0 | 0 | 0 | 104 | 0 | |
| 9 | | 0 | 0 | 0 | 0 | 25 | 44 | 143 | 13 | 0 | 0 | 0 | 9 | 100 | 31 | |
| 10 | | 0 | 0 | 0 | 0 | 7 | 52 | 46 | 94 | 11 | 0 | 9 | 68 | 28 | 36 | |
| 11 | | 0 | 0 | 0 | 0 | 0 | 12 | 42 | 104 | 83 | 0 | 66 | 73 | 33 | 7 | |
| 12 | | 0 | 0 | 0 | 0 | 0 | 1 | 36 | 25 | 123 | 0 | 98 | 18 | 25 | 0 | |
| 13 | | 0 | 0 | 0 | 0 | 0 | 0 | 36 | 0 | 108 | 0 | 85 | 0 | 25 | 0 | |
| 14 | | 0 | 0 | 0 | 0 | 0 | 0 | 36 | 0 | 108 | 0 | 85 | 0 | 25 | 0 | |
| 15 | | 0 | 0 | 0 | 0 | 0 | 0 | 36 | 0 | 108 | 0 | 90 | 0 | 27 | 0 | |
| 16 | | | | | | | | | | | | | | | | |

| | A | B | C | D | E | F | G | H | I | J | K | L | M | N | O | P |
|---|---|---|---|---|---|---|---|---|---|---|---|---|---|---|---|---|
| 1 | | | | | | | | | | | | | | | | |
| 2 | | 0 | 0 | 0 | 0 | 0 | 0 | | 0 | 0 | 0 | 0 | 0 | 0 | | |
| 3 | | 0 | 0 | 0 | 0 | 0 | 0 | | 1 | 0 | 0 | 0 | 1 | 0 | 0 | |
| 4 | | 0 | 0 | 0 | 0 | 0 | 0 | 4 | 13 | 0 | 0 | 0 | 13 | 4 | 0 | |
| 5 | | 0 | 0 | 0 | 0 | 0 | 4 | 19 | 21 | 20 | 0 | 20 | 21 | 19 | 4 | |
| 6 | | 0 | 0 | 0 | 0 | 4 | 26 | 21 | 51 | 7 | 0 | 7 | 51 | 21 | 25 | |
| 7 | | 0 | 0 | 0 | 0 | 14 | 25 | 100 | 8 | 0 | 0 | 0 | 8 | 93 | 24 | |
| 8 | | 0 | 0 | 0 | 0 | 25 | 0 | 133 | 0 | 0 | 0 | 0 | 0 | 104 | 0 | |
| 9 | | 0 | 0 | 0 | 0 | 25 | 44 | 143 | 13 | 0 | 0 | 0 | 9 | 100 | 31 | |
| 10 | | 0 | 0 | 0 | 0 | 7 | 52 | 46 | 94 | 11 | 0 | 9 | 68 | 28 | 36 | |
| 11 | | 0 | 0 | 0 | 0 | 0 | 12 | 42 | 104 | 83 | 0 | 66 | 73 | 33 | 7 | |
| 12 | | 0 | 0 | 0 | 0 | 0 | 1 | 36 | 25 | 123 | 0 | 98 | 18 | 25 | 0 | |
| 13 | | 0 | 0 | 0 | 0 | 0 | 0 | 36 | 0 | 108 | 0 | 85 | 0 | 25 | 0 | |
| 14 | | 0 | 0 | 0 | 0 | 0 | 0 | 36 | 0 | 108 | 0 | 85 | 0 | 25 | 0 | |
| 15 | | 0 | 0 | 0 | 0 | 0 | 0 | 36 | 0 | 108 | 0 | 90 | 0 | 27 | 0 | |
| 16 | | | | | | | | | | | | | | | | |

250 → 4, 254 → 12; 252 ← 4, 256 ← 12

|   | A | B | C | D | E | F | G | H | I | J | K | L | M | N | O | P |
|---|---|---|---|---|---|---|---|---|---|---|---|---|---|---|---|---|
| 1 | | | | | | | | | | | | | | | | |
| 2 | | 0 | 0 | 0 | 0 | 0 | 0 | 0 | 0 | 0 | 0 | 0 | 0 | 0 | | |
| 3 | | 0 | 0 | 0 | 0 | 0 | 0 | 0 | 1 | 0 | 0 | 0 | 1 | 0 | 0 | |
| 4 | | 0 | 0 | 0 | 0 | 0 | 0 | 4 | 13 | 0 | 0 | 0 | 13 | 4 | 0 | |
| 5 | | 0 | 0 | 0 | 0 | 0 | 4 | 19 | 21 | 20 | 0 | 20 | 21 | 19 | 4 | |
| 6 | | 0 | 0 | 0 | 0 | 4 | 26 | 21 | 51 | 7 | 0 | 7 | 51 | 21 | 25 | |
| 7 | | 0 | 0 | 0 | 0 | 14 | 25 | 100 | 8 | 0 | 0 | 0 | 8 | 93 | 24 | |
| 8 | | 0 | 0 | 0 | 0 | 25 | 0 | 133 | 0 | 0 | 0 | 0 | 0 | 104 | 0 | |
| 9 | | 0 | 0 | 0 | 0 | 25 | 44 | 143 | 13 | 0 | 0 | 0 | 9 | 100 | 31 | |
| 10 | | 0 | 0 | 0 | 0 | 7 | 52 | 46 | 94 | 11 | 0 | 9 | 68 | 28 | 36 | |
| 11 | | 0 | 0 | 0 | 0 | 0 | 12 | 42 | 104 | 83 | 0 | 66 | 73 | 33 | 7 | |
| 12 | | 0 | 0 | 0 | 0 | 0 | 1 | 36 | 25 | 123 | 0 | 98 | 18 | 25 | 0 | |
| 13 | | 0 | 0 | 0 | 0 | 0 | 0 | 36 | 0 | 108 | 0 | 85 | 0 | 25 | 0 | |
| 14 | | 0 | 0 | 0 | 0 | 0 | 0 | 36 | 0 | 108 | 0 | 85 | 0 | 25 | 0 | |
| 15 | | 0 | 0 | 0 | 0 | 0 | 0 | 36 | 0 | 108 | 0 | 90 | 0 | 27 | 0 | |
| 16 | | | | | | | | | | | | | | | | |

FIG. 8G — 260

ELECTRONIC IMAGING DEVICE FOCUSING

BACKGROUND

Electronic imaging devices are used in a wide range of applications and are steadily becoming less expensive and simpler to use. Electronic imaging devices, such as digital cameras, typically convert light to electrical signals using a two-dimensional photodetector. The photodetector contains a two-dimensional array of thousands or even millions of light-sensitive cells, each capturing one picture element (or pixel) of an image. As an image is focused onto the photodetector, an electrical charge builds up in the photodetector cells. The magnitude of the electrical charge corresponds to the intensity of the image light—brighter light generates a larger electrical charge. Thus, the image light focused on the photodetector generates a pattern of varying electrical charges across the photodetector. The magnitudes of the electrical charges across the photodetector are analyzed and stored in the electronic imaging device as an electronic representation of the image. In a digital imaging device such as a digital camera, the magnitude of the electrical charges is converted into a number in an analog to digital (A/D) converter.

Several types of two-dimensional photodetectors are commonly used in electronic imaging devices, including charge-coupled devices (CCDs) and complementary metal-oxide semiconductor (CMOS) sensors. The electrical charges in a CCD are read by shifting or moving them in a series across the photodetector and reading them one by one at an output. The electrical charges in the CCD are amplified if needed and read by an external A/D converter. CCD photodetectors provide high-quality images because they are not very susceptible to noise, but they consume a great deal of power and must be read in serial fashion, bit by bit. CMOS sensors are generally more susceptible to noise than CCDs but are much less expensive because they can be manufactured on standard silicon integrated circuit production lines. Each cell in a typical CMOS sensor includes several transistors to amplify the electrical charge internally and move it across traditional wires. Each row is generally accessible, starting at row zero and providing input pulses to shift to the desired row. A clock input is then used to access the desired pixels in the selected row. Thus, desired image data can be accessed without shifting the entire image to the output.

Several main focusing techniques exist for electronic imaging devices having photodetectors such as CMOS sensors or CCDs, including active and passive focusing. Active focusing involves shining infrared light from the electronic imaging device onto a focus object. A photosensor in the electronic imaging device receives infrared light reflected from the focus object and compares it with the transmitted infrared light to determine the distance from the electronic imaging device to the focus object. A lens in the electronic imaging device can then be set to the proper focus position according to that distance. Active focusing can be very fast, but it increases the cost of an electronic imaging device and it does not work well with some types of focus objects.

Passive focusing involves capturing consecutive images while adjusting the lens in the electronic imaging device and comparing the images to determine when the electronic imaging device is properly focused. For example, the electronic imaging device may search for the focus position that results in the maximum intensity difference between adjacent pixels in an image. Passive focusing is well suited for inexpensive imaging devices because it does not require additional expensive and complex components. However, conventional passive focusing is substantially slower than active focusing. This situation adds to the already long image capture delay in most electronic imaging devices.

SUMMARY

An embodiment of the invention decreases the time required to passively focus an electronic imaging device by effectively decreasing the field of focus used to focus the electronic imaging device. During the passive focusing process, images are repeatedly captured at different focus settings and the image data is analyzed to determine which of the focus settings used is best, using any suitable technique such as searching for maximum contrast.

During this passive focusing process, images are captured at different focus settings using a randomly accessible photodetector such as a CMOS sensor in the electronic imaging device. As the passive focusing process is being performed, the images are analyzed to identify at least one region in the image which is most affected by focus changes. Subsequent images captured for the passive focusing process are captured from the most affected region rather than from the entire randomly accessible photodetector. (Alternatively, a sequentially accessible photodetector such as a CCD may be used, with unwanted image data discarded.) The process of identifying changing regions may be performed recursively during the focusing process, selecting successively smaller regions to sample from the previous larger regions, thereby reducing the amount of data processed and reducing the time required to passively focus the electronic imaging device.

BRIEF DESCRIPTION OF THE DRAWINGS

Illustrative embodiments of the invention are shown in the accompanying drawing, in which:

FIG. 8A is a matrix containing exemplary image data generated by an embodiment of an electronic imaging device, the image data having been captured at a first focus setting;

FIG. 8B is a matrix containing exemplary focus measure data based on the image data of FIG. 8A, the focus measure data having been generated by a Tenengrad edge detection passive autofocus algorithm;

FIG. 8C is a matrix containing second exemplary image data generated by an embodiment of an electronic imaging device, the image data having been captured at a second focus setting;

FIG. 8D is a matrix containing exemplary focus measure data based on the image data of FIG. 8C, the focus measure data having been generated by a Tenengrad edge detection passive autofocus algorithm;

FIG. 8E is a matrix containing differential focus measures based on the focus measure data of FIGS. 8B and 8D;

FIG. 8F is a matrix indicating selection of a rectangular focus region based on the differential focus measures of FIG. 8E;

FIG. 8G is a matrix indicating selection of an irregular focus region based on the differential focus measures of FIG. 8E.

DESCRIPTION

Figure 1:
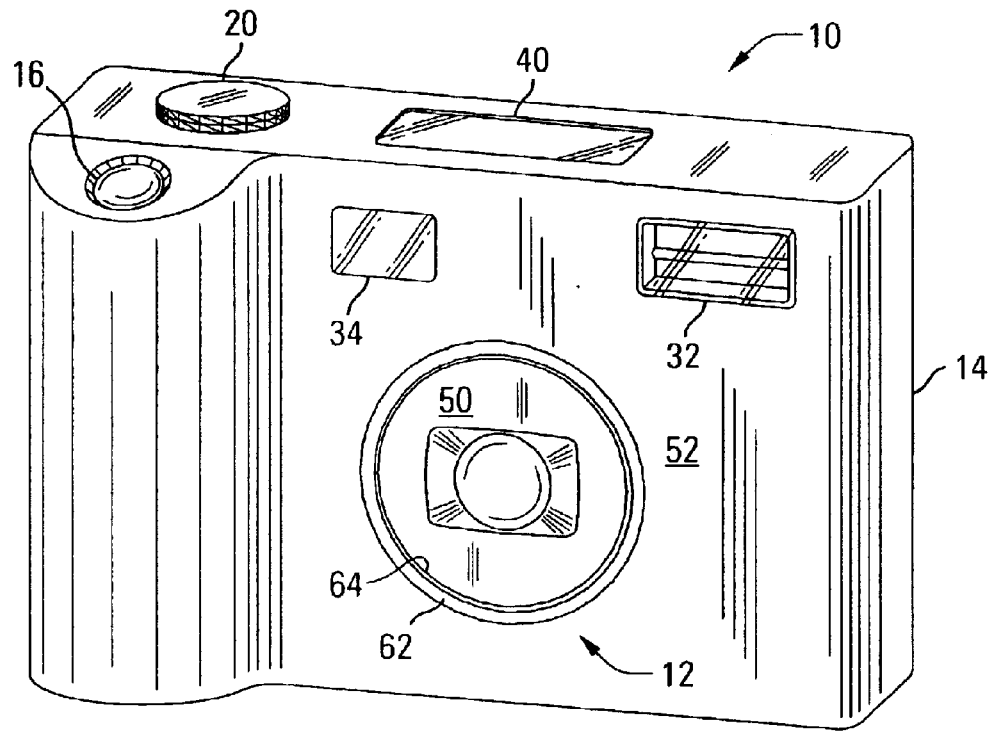
FIG. 1 is an isometric front view illustration of an exemplary embodiment of an electronic imaging device with an adjustable-focus lens.

The drawing and description, in general, disclose an electronic imaging device in which automatic focusing may be dramatically faster than existing conventional methods by reducing the field of focus of sample images used during focusing.

The term "field of focus" as used herein refers to the region or regions in an electronic image that are used to determine whether the electronic imaging device is properly focused.

The electronic imaging device is focused automatically using any suitable focus algorithm which identifies a proper focus setting based on image data captured by the photodetector in the imaging device. During the passive autofocus process, images or data samples are repeatedly captured from the photodetector as the focus setting in the electronic imaging device is varied. The data samples are analyzed to determine the optimum focus setting, using any number of passive autofocus algorithms, most of which use processor intensive calculations. However, these processor intensive calculations may be dramatically reduced by reducing the field of focus in the data samples that are analyzed during the passive autofocus process.

In one exemplary embodiment, the electronic imaging device includes a randomly accessible photodetector, meaning that portions of images may be captured from the photodetector without having to read the entire output of the photodetector. The image portions, or regions, that are read from the photodetector are repeatedly reduced in successive data samples. Thus, both data acquisition and processing time may be dramatically reduced during the passive autofocus process.

In another exemplary embodiment, the electronic imaging device includes a sequentially accessible photodetector such as a charge-coupled device (CCD), in which the data for the entire image must be read. In this embodiment, the entire image is captured at each successive focus setting, but portions of the images are discarded to form the desired reduced data samples, and the reduced data samples are analyzed as will be described in detail hereinafter. Thus, processing time may be reduced during the passive autofocus process.

The electronic imaging device using reduced field of focus while passively autofocusing may comprise any type of imaging device having an electronic photodetector and an adjustable-focus lens assembly. Although the accelerated passive autofocus process using reduced field of focus will be described herein with respect to a digital camera, it is important to note that it is not limited to use with any particular type of imaging device. Before describing the autofocus process in detail, an exemplary digital camera with an electronic photodetector and adjustable-focus lens assembly will be described.

Figure 2:
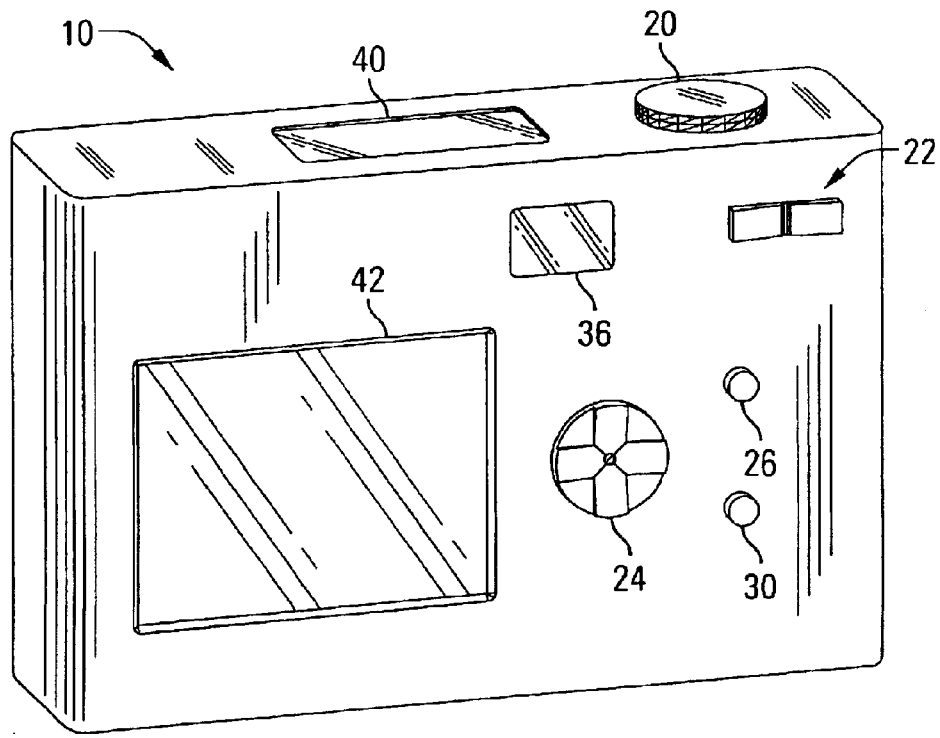
FIG. 2 is an isometric rear view illustration of the exemplary embodiment of the electronic imaging device of FIG. 1.
Figure 3:
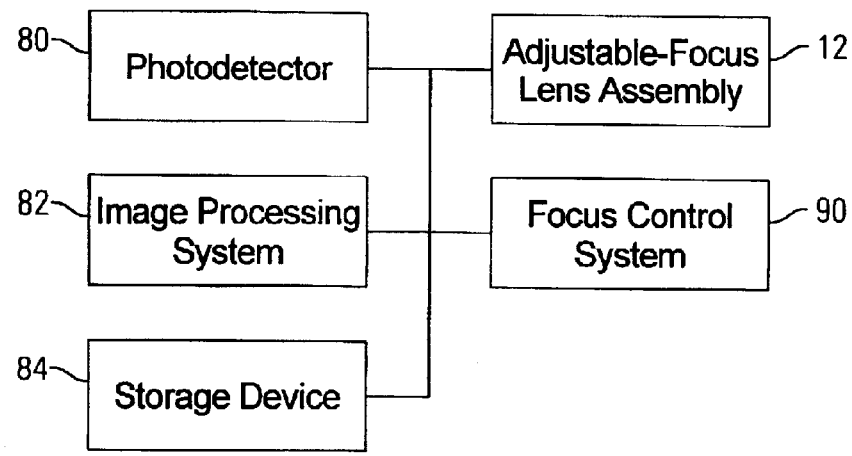
FIG. 3 is a block diagram of an exemplary embodiment of an electronic imaging device.

Referring now to FIGS. 1 through 3, an exemplary digital camera 10 comprises a housing portion or body 14 which is sized to receive the various systems and components required by the digital camera 10. For example, in the embodiment shown and described herein, the body 14 is sized to receive the adjustable-focus lens assembly 12, a photodetector 80, a storage device 84 to store the image data collected by the photodetector 80, and an image processing system 82 to process and format the image data. The adjustable-focus lens assembly 12 is located in the body 14 to allow light to enter the digital camera 10. The body 14 may also be sized to receive a power source such as a battery. Control buttons such as a shutter control button 16, a mode dial 20, a zoom control switch 22, and others (e.g., 24, 26, and 30) as needed are provided on the outside of the body 14. The digital camera 10 may include an illumination system such as a flash 32 mounted on the outside of the body 14. Viewfinder windows 34 and 36 and display devices 40 and 42 are also located on the outside of the body 14. Each of the foregoing systems and devices will now be described.

Figure 4:
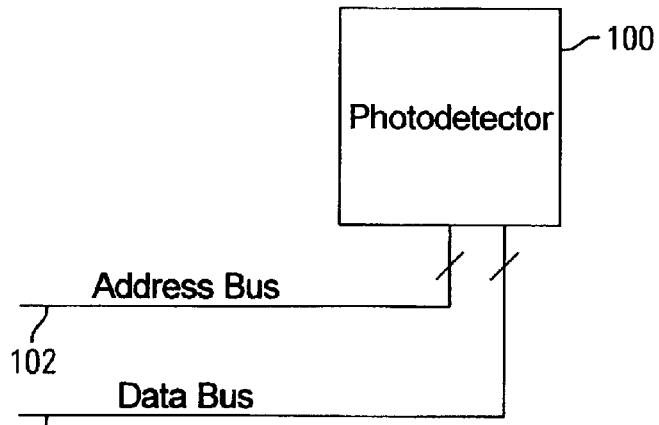
FIG. 4 is an illustration of an embodiment of a single randomly accessible photodetector.

Image light enters the digital camera 10 through the adjustable-focus lens assembly 12. The photodetector 80 detects the image light focused thereon by the adjustable-focus lens assembly 12. As mentioned above, in one exemplary embodiment the photodetector 80 comprises a randomly accessible photodetector, such as a complementary metal-oxide semiconductor (CMOS) sensor (100, FIG. 4). The term "randomly accessible photodetector" is used herein to refer to any type of two-dimensional optical sensor array for converting light to electrical signals, in which portions of the output may be read without reading the entire array output. For example, in a CMOS sensor, single picture elements (pixels) or small groups of pixels are addressable and readable. In typical CMOS sensors, a two-dimensional array of individual cells or pixels, each of which collects or builds up an electrical charge in response to exposure to light. Because the quantity of the accumulated electrical charge in any given cell or pixel is related to the intensity and duration of the light exposure, a CMOS sensor may be used to detect light and dark spots in an image focused thereon.

The term image light as used herein refers to the light, visible or otherwise, that is focused onto the surface of the photodetector by the adjustable-focus lens assembly 12. The image light may be converted into digital signals in essentially three steps. First, each pixel in the photodetector converts the light it receives into an electric charge. Second, the charges from the pixels are amplified by an analog amplifier. Finally, the amplified analog charges are digitized by an analog-to-digital (A/D) converter, representing the voltage level of the amplified charges with a number. The digital data then may be processed and/or stored as desired.

In a CMOS sensor, several transistors are included at each pixel which amplify and transmit the analog electrical charge across the sensor on wires to the A/D converter, thereby allowing each pixel to be individually accessed. An address bus 102 and data bus 104 in the CMOS sensor 100 are provided so that individual pixels may be addressed and read.

Figure 5:
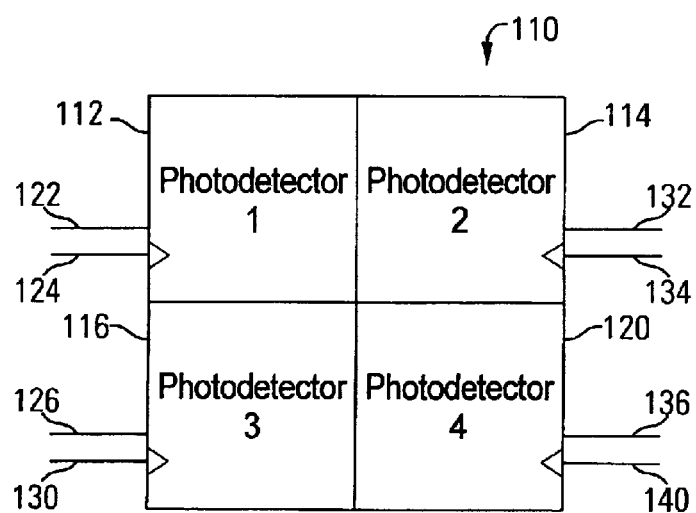
FIG. 5 is an illustration of an embodiment of multiple adjacent photodetectors which combine to capture a single unified image.

The randomly accessible photodetector may alternatively comprise a sensor having multiple serially accessible regions, each of which must be completely read, but which may be individually accessed. This exemplary photodetector 110 is illustrated in FIG. 5, and includes four individually accessible sensor regions 112, 114, 116 and 120. The four sensor regions 112, 114, 116 and 120 are adjacent one another, combining to capture a single image. Each sensor region 112, 114, 116 and 120 is accessed or read by serial data lines 122, 126, 132, and 136 and their associated clock signals 124, 130, 134, and 140. Thus each region must be entirely read like a CCD, but the four regions are individually accessible, allowing portions of images to be read.

In another exemplary embodiment the photodetector 80 comprises a serially accessible photodetector such as a CCD, although other devices may be used. Data for an entire image must be read at one time from serially accessible photodetectors. A typical CCD comprises an array of individual cells or pixels, each of which collects or builds up an electrical charge in response to exposure to light, as in a CMOS sensor. In a CCD, the electrical charges accumulated by each pixel are shifted serially across the photodetector and may be read at one corner of the array, thus requiring the entire image to be read.

The different types of photodetectors discussed above are purely exemplary and are included to illustrate that the passive focusing algorithm with reduced field of focus is not limited to any particular type or configuration of photodetector. The focusing algorithm may be adapted to any type of photodetector that converts light to an electrical signal, although greater benefits may be provided by randomly accessible photodetectors such as a CMOS sensor.

A storage device 84 is located in the body 14 of the digital camera 10 to store the image data captured by the photodetector 80. The storage device 84 comprises any suitable type of memory, such as a removable rewriteable non-volatile memory, random access memory (RAM), or any other magnetic, optical, or other solid state storage medium.

An image processing system 82 is located in the body 14 of the digital camera 10 to process and format the image data, either before or after storage in the storage device 84. The image processing system 82 may comprise a microprocessor and associated memory. Alternatively, the image processing system 82 may comprise a hard-coded device such as an application specific integrated circuit (ASIC). The image processing system 82 processes image data to scale images for display on a graphical display device 42, among other tasks. For example, the image processing system 82 may also perform filtering and de-mosaic functions.

A focus control system 90 is provided in the digital camera 10 to control the passive autofocus process, including reducing the field of focus, as will be described below. The focus control system 90 may be implemented by the same microprocessor or hard-coded device as the image processing system 82, or may be a separate component in the digital camera 10, such as a microprocessor and memory, ASIC, state machine and programmable read-only-memory (PROM), etc. Instructions in the focus control system 90 for directing the passive autofocus process may comprise firmware code stored in a memory, or may be hard-coded in the control system 90, or may be implemented in any other suitable and desired manner.

The graphical display device 24 comprises a liquid crystal display (LCD) or any other suitable display device. An alphanumeric display device 40 on the digital camera 10 also comprises an LCD or any other suitable display device, and is used to indicate status information, such as the number of images which can be captured and stored in the storage device 84, and the current mode of the digital camera 10.

The digital camera 10 may also include other components, such as an audio system. However, because digital cameras are well-known in the art and could be provided by persons having ordinary skill in the art after having become familiar with the teachings of the present invention, the digital camera 10 utilized in one embodiment of the present invention, as well as the various ancillary systems and devices (e.g., battery systems and storage devices) that may be utilized in one embodiment of the present invention will not be described in further detail herein.

During operation of the digital camera 10, the digital camera 10 is turned on and off by one of the control buttons such as the mode dial 20, and a mode is selected, such as a single or multiple exposure mode. The digital camera 10 is oriented with the adjustable-focus lens assembly 12 directed at a subject. The subject may be monitored either through a viewfinder 34 and 36, or on the graphical display panel 42. If the adjustable-focus lens assembly 12 is a zoom lens, the focal length is adjusted by pressing a control button such as the zoom control switch 22.

As the shutter control button 16 is pressed, the passive autofocus process is initiated by the focus control system 90, and focus lens elements in the adjustable-focus lens assembly 12 are adjusted to focus image light from the focus object onto the photodetector 80. The flash 32 illuminates the subject, if needed. The photodetector 80 then converts the image light directed thereon by the adjustable-focus lens assembly 12 into electrical image data, which are stored in the storage device 84. The image processing system 82 then processes the image data and displays the captured image on the display device 42.

Before continuing to discuss reduction of the field of focus in the electronic imaging device, a brief discussion of passive autofocus algorithms will be given. As mentioned above, the electronic imaging device is not limited to use with any particular passive autofocus algorithms, and many suitable algorithms are known. The electronic imaging device 10 may thus be adapted to use any passive autofocus algorithm that identifies the proper focus setting based on data captured by the photodetector 80. Existing passive autofocus algorithms typically move the adjustable-focus lens assembly 12 through a range of different focus settings, capturing images along the way. The images are then analyzed to determine which focus setting results in the sharpest, or properly focused, image. Typically passive autofocus algorithms calculate a number that in some way reflects how well the image is focused. This number is referred to herein as a focus measure.

Several applicable passive autofocus algorithms are described in the following articles which are hereby expressly incorporated herein for all that they disclose: G. Ligthart, and F. C. A. Groen, "A Comparison of Different Autofocus Algorithms," Proc. of IEEE Int. Conf. on Pattern Recognition, pp.597–600, 1982; Je-Ho Lee, et al., "Implementation of a Passive Automatic Focusing Algorithm for Digital Still Camera," IEEE Trans. on Consumer Electronics, 41(3):449–454, August 1995; E. Krotkov, "Focusing," Intl. Journal of Computer Vision, vol. 1, no. 3, October 1987, pp. 223–237; and M. Subbarao, T. Choi and A. Nikzad, "Focusing Techniques," Proceedings SPIE, Boston, Massachusetts, Vol 1823, pp. 163–174, November 1992.

The exemplary embodiments of the electronic imaging device described herein are adapted to use a passive autofocus algorithm based on edge detection, and specifically the Tenengrad autofocus algorithm. This algorithm applies an edge detection mask by multiplying each pixel in the image by an operator such as the Sobel operator, thus determining the strength of the horizontal and vertical gradients in the image. The Sobel horizontal and vertical operators, or convolution kernels, are as follows:

$$i_x = \frac{1}{4}\begin{bmatrix} -1 & 0 & 1 \\ -2 & 0 & 2 \\ -1 & 0 & 1 \end{bmatrix}, \text{ and } i_y = \frac{1}{4}\begin{bmatrix} 1 & 2 & 1 \\ 0 & 0 & 0 \\ -1 & -2 & -1 \end{bmatrix}$$

The focus measure calculated by the Tenengrad autofocus algorithm is referred to as a gradient magnitude, which is calculated as follows for each pixel:

$$S = i_x^2 + i_y^2$$

The gradient magnitude may be calculated for the entire image (or for portions of the image) by taking the sum of the gradient magnitudes for the image portion, as follows:

$$\Sigma(S, \text{ for } S>T)$$

where T is a threshold value of zero. The resulting overall gradient magnitude is generally greater for more sharply focused images, as the edges, thus the gradients, are more defined and the image has greater contrast. To apply the Tenengrad autofocus algorithm with Sobel operators as described above, a sample image is captured, each pixel is multiplied by the Sobel operators and the gradient magnitude is calculated for each pixel, then summed over the entire image to produce the overall gradient magnitude. The focus setting in the electronic imaging device is moved to the next position, a new image is captured, and the overall gradient magnitude for that image is calculated. As the optimum focus setting is approached, the gradient magnitudes of the sample images will rise, and as the optimum focus setting is passed, the gradient magnitudes of the sample images will begin to fall.

The term "optimum focus setting" is used herein to refer to a focus setting which is determined to be acceptable. This is not necessarily the best possible focus setting, as the best possible focus setting is to some extent subjective, and different passive autofocus algorithms may identify different focus settings as optimum.

The field of focus reduction used to speed the passive autofocus process will now be described in more detail. As sample images are captured and analyzed to determine a focus measure for each, the field of focus, or the number of pixels in each sample image, is reduced. This can greatly reduce the amount of sample data that must be analyzed when calculating a focus measure for each sample image at each focus setting.

To reduce the field of focus, pixels or groups of pixels in each image are identified which are affected by focus changes. Depending on the content of the image, some pixels may be substantially unaffected by focus changes, such as pixels making up the image of a cloudless sky containing no sharp features, while other pixels making up the image of foreground subjects may be greatly affected by focus changes. In other images, such as those in which all objects in view are located within a narrow depth of field, all pixels may be affected to some extent by focus changes. In this case, the pixels that are most affected by focus changes will be identified for use in calculating focus measures.

By discarding the pixels least affected by focus changes, focus measures are calculated for small fractions of overall images, greatly simplifying and speeding focus measure calculations.

The method used to identify which pixels are most affected by focus changes is dependent upon the passive autofocus algorithm used. For the exemplary embodiments described herein, pixels most affected by focus changes are identified by calculating differential focus measures for pixels or regions in sequential image samples. The differential focus measures may be calculated by simply taking the absolute value of the difference between gradient magnitudes for pixels or regions between sequential image samples. Thus, if the pixel or region is substantially the same in two sequential image samples, meaning that it is unaffected by focus changes between the two samples, the differential focus measure will be close to zero. For pixels or regions greatly affected by focus changes, the differential focus measure will be larger, indicating that the particular pixels or regions are more affected by focus changes and are good candidates for inclusion in subsequent focus measure calculations.

Other suitable methods of identifying pixels or regions affected by focus changes may be used. For example, other passive autofocus algorithms may produce other types of focus measures that lead to other methods of identifying affected pixels. One alternative method of identifying affected pixels operates directly on the image data rather than on focus measures. In this alternative the absolute value of the difference between pixel values in subsequent frames may be calculated.

Regions may be identified as affected by focus changes in any fashion desired. For example, the regional differential focus measures may be sorted from highest to lowest, with the region having the highest differential focus measure selected. Alternatively, a predetermined threshold value or percentage may be established for the regional differential focus measures, so that if the differential focus measure for a region exceeds a certain value or a certain percentage of the maximum regional differential focus measure in the image, the region is identified as affected by focus changes.

Other information may also be factored into the selection of a focus region to use in subsequent focus measure calculations, such as whether the region is in an area of interest in the image. In any given image, there may be multiple regions affected by focus changes, and regions in areas of interest may be given priority. Weighting certain areas of the image frame more heavily than others can help prevent discarding regions containing the desired focus subject before it comes close enough to being focused for it to be affected by focus changes. For example, the focus spot near the center of the frame may be weighted more heavily than the edges of the frame. Thus, if two regions are affected by focus changes, one near the center of the frame and one near the edges, it may be better to select the region near the center of the frame, even if it is affected less by focus changes than the region near the edge. It may also be advantageous to select multiple regions for use by the passive autofocus algorithm.

The electronic imaging device 10 may also provide for user configuration of region selection, such as the ability to turn field of focus reduction on or off, the minimum acceptable region size, and the weighting of areas in the image.

Figure 6A:
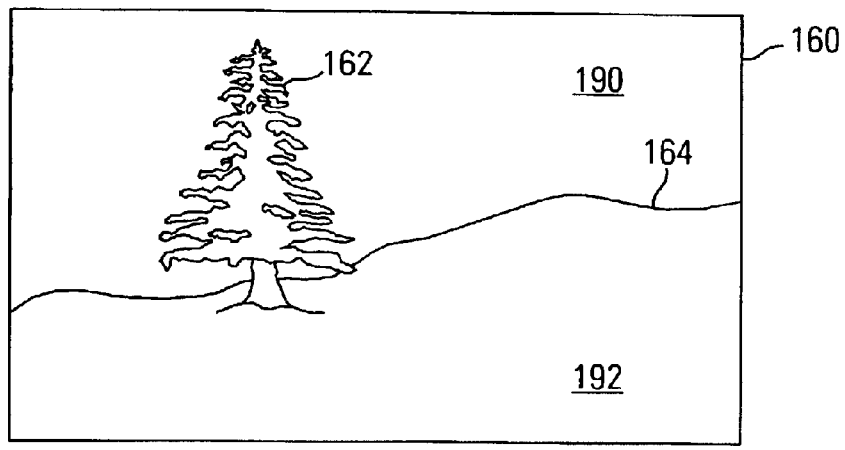
FIG. 6A is an illustration of an exemplary image generated by an embodiment of an electronic imaging device.
Figure 6B:
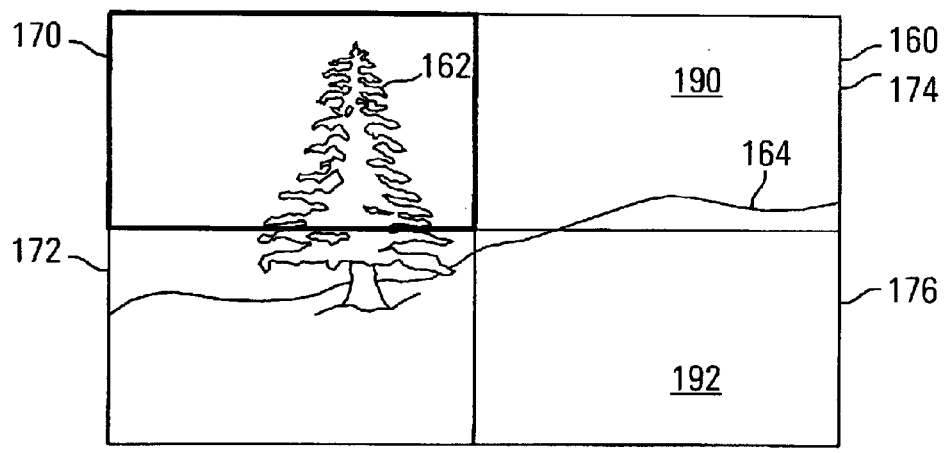
FIG. 6B is an illustration of the exemplary image of FIG. 6A, having been divided into rectangular focus regions.
Figure 6C:
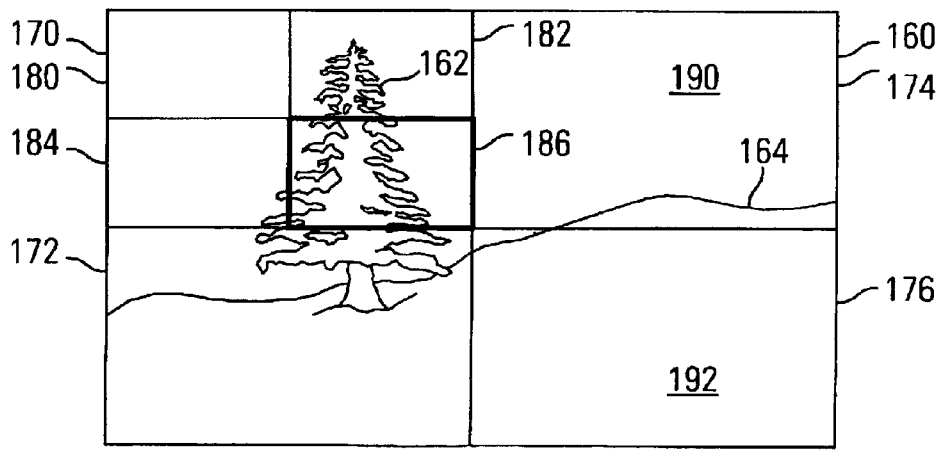
FIG. 6C is an illustration of the exemplary image of FIGS. 6A and 6B, having been divided into even smaller rectangular focus regions.

Field of focus reduction is illustrated in FIGS. 6A–6C. FIG. 6A contains an illustration of an image 160 of a tree 162 against a featureless sky 190 and foreground 192, which are divided by the horizon 164. The image 160 comprises the entire output of the photodetector 80 in the electronic imaging device 10. As illustrated in FIG. 6B, the image 160 may be divided into regions 170, 172, 174 and 176, with a focus measure calculated for each region 170, 172, 174 and 176. To select the region most effected by focus changes, four differential focus measures are calculated, one for each region 170, 172, 174 and 176. To calculate these four differential focus measures, two samples of the entire image 160 are captured, each at a different focus setting. Eight focus measures are calculated, one for each region of each of the two samples. The absolute value of the difference between the focus measures for each region of the two sample images is calculated. The resulting four differential focus measures may then be compared to identify the largest, indicating the region most affected by the focus change.

For the exemplary image of FIGS. 6A–6C, the region 170 in the upper left quadrant of the image 160 is likely most affected by focus changes, as it contains most of the tree 162. The featureless sky 190 is unlikely to contain many edges that would be affected by focus changes. The foreground 192 is large but is spread over a large range of distances. Thus only portions of it will be greatly affected by focus changes at any one time from sample to sample. Furthermore, using the edge detection method of autofocusing discussed herein, the foreground 192 would need to contain many edges or a great deal of contrast to be a good subject for focusing. The tree 162 would thus likely result in the largest differential focus measures in the image 160, and the tree is mostly contained in the upper left region 170. In other words, the majority of the pixels affected by focus changes are located in the upper left region 170.

The third sample image captured need only contain image data from the upper left region 170, either not reading or discarding the image data from the remaining regions 172, 174, and 176, depending upon whether or not a randomly accessible photodetector 80 is used.

The field of focus may be repeatedly reduced, as illustrated in FIG. 6C. The upper left region 170 is again subdivided, generating four new quadrants 180, 182, 184 and 186. Image data in the third sample from the upper left region 170 is compared with image data in the second sample from the upper left region 170, generating focus measures and differential focus measures for the four new quadrants 180, 182, 184 and 186 based upon the second and third data samples. A new smaller region may then be selected by comparing the new differential focus measures for the four new quadrants 180, 182, 184 and 186. In this case, most of the tree 162 lies in new quadrant 186, so it would likely be identified as most affected by focus changes. The fourth data sample at the fourth focus setting need only include image data from the new quadrant 186, having only one sixteenth the image data of the entire image 160. Thus, the passive autofocus process may be much faster by greatly reducing the amount of data processed.

As described above, the field of focus reduction may be repeated as desired during the focusing process, or it may be performed a single time. Repeated field of focus reduction may be performed recursively, where smaller regions are selected from previous larger regions successively. If the field of focus reduction is performed repeatedly, a minimum region size may be established to prevent the focus region from being reduced too far, thereby ensuring that each data sample used will have a sufficiently large field of focus for accurate focus calculations.

Although the examples shown in FIGS. 6A–6C divide previous regions by four to narrow the field of focus, it may be more efficient to otherwise divide the image 160, such as into sixteenths. The number of divisions may be selected to increase speed and efficiency of processing. A larger number of divisions would more rapidly reduce the amount of image data used in the focusing process, but would slightly complicate calculations and comparisons of differential focus measures.

Note that reducing the field of focus during the passive autofocus process does not require any extra data samples to be captured, as long as newly identified small regions of image data can be retrieved from previously stored larger regions for use in calculating differential focus measures. For example, two full images are captured at different focus settings for the image in FIG. 6A, resulting in four differential focus measures. The third data sample captured need only be from the upper left region 170 illustrated in FIG. 6B, taken at a third focus setting. At this point, if the image data of the second data sample can be retrieved from memory and divided into the four smaller quadrants 180, 182, 184 and 186, it can be compared with the third data sample taken from the upper left region 170 without requiring an additional data sample to be captured.

Memory usage may be optimized by removing image data from memory in the electronic imaging device 10 as soon as it is no longer needed. The details on when image data may be removed are dependent upon how regions are selected, whether they have regular or irregular shapes, and whether the field of focus reduction is performed in a single stage or is done repeatedly. For example, in the example discussed above and illustrated in FIGS. 6A–6C, assuming that the focus improves at each subsequent focus setting, the first sample may be removed from memory as soon as the focus measures and differential focus measures are calculated for the first two samples. As soon as the upper left quadrant 170 is selected as the next region to use in the autofocus process, image data from the remaining three regions in the second sample may be removed from memory, and so on.

Figure 7A:
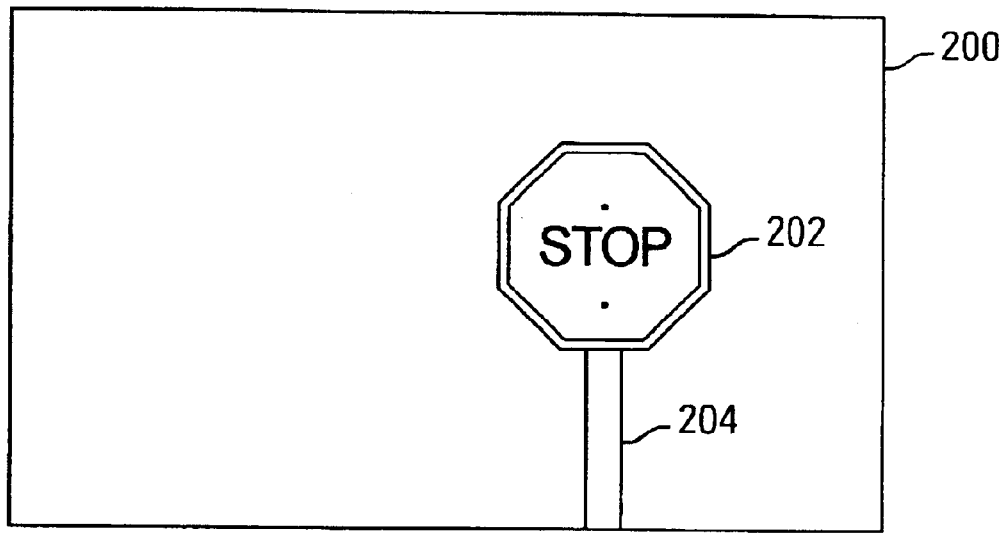
FIG. 7A is an illustration of an exemplary image generated by an embodiment of an electronic imaging device.

The examples of FIGS. 6A–6C illustrated the selection of regions having regular shapes. Alternatively, irregularly shaped regions or groups of pixels may be selected for inclusion in the autofocus process. These regions or groups of pixels are also selected by identifying those most affected by focus changes, such as by using differential focus measures as described above. Referring now to FIG. 7A, an image 200 of a stop sign 202 on a post 204 is shown. Differential focus measures are calculated for each pixel in the image 200 to select the irregular region 206 shown in FIG. 7B. The shape of the irregular region 206 may depend upon which passive autofocus algorithm is employed. In this case, using the Tenengrad edge detection algorithm, the irregular region 206 affected by focus changes surrounds the edges of the stop sign 202 and post 204.

The pixels included in the irregular region 206 may be selected in any fashion desired, based upon whether they are affected by focus changes. For example, a predetermined threshold value or percentage may be established for the differential focus measures, so that if the differential focus measure for a pixel exceeds a certain value or a certain percentage of the maximum differential focus measure in the image, the pixel is included in the irregular region 206.

Figure 7B:
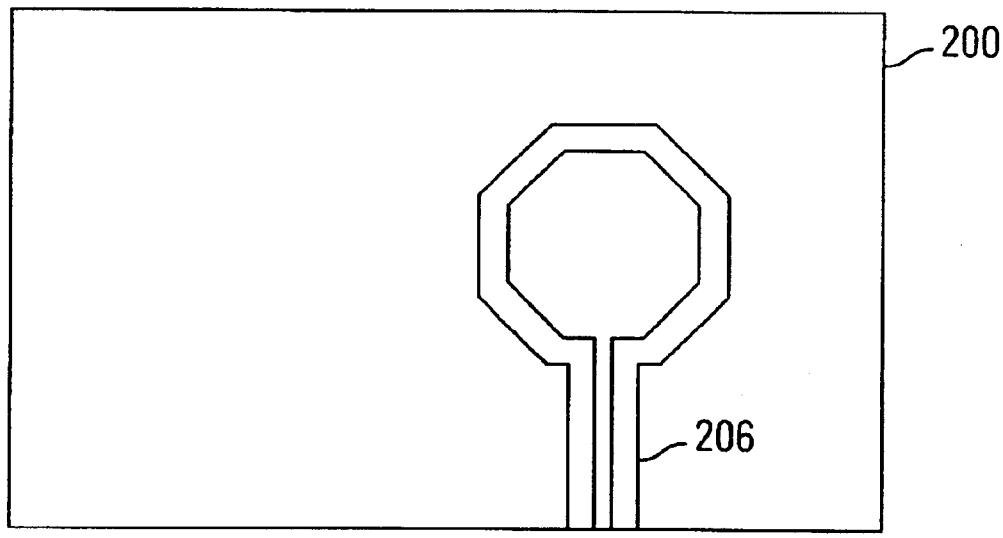
FIG. 7B is an illustration of the exemplary image of FIG. 7A, with a smaller irregular focus regions having been identified.

Note that irregular regions such as that illustrated in FIG. 7B could not be exclusively captured by a serially accessible photodetector such as a CCD, that is, without also capturing unwanted image data. Although irregular regions may be obtained by reading an entire image and discarding unwanted image data, it is most efficient to use a randomly accessible photodetector such as a CMOS sensor. Moreover, depending upon how image data is retrieved from the randomly accessible photodetector, it may be advantageous to create somewhat more regularly shaped regions by trimming edges and offshoots of irregularly shaped regions, thereby enabling block read operations.

Exemplary exposure image data, focus measures and differential focus measures for the sample image 200 of FIG. 7A are illustrated in the matrices of FIGS. 8A–8G. Please note that the exemplary exposure image data is greatly simplified to consist of an 8-bit black and white image having only 256 pixels. Actual color image data is much more complex, having red, green and blue (RGB) components and millions of pixels with 24-bit or larger values. However, processing of actual exposure image data is well known for the existing passive autofocus algorithms, and differential focus measure calculations may be adapted to any passive autofocus algorithms.

The exemplary stop sign 202 and post 204 are brighter than the background, thus the exposure image data seen in the matrix of FIG. 8A are larger for the area 220 containing the stop sign 202 and post 204 than for the background 222. The stop sign 202 and post 204 have exposure image data ranging from values of 13 to 19, while the background has exposure image data ranging from values of 1 to 3. Note that the stop sign 202 and post 204 are not sharply focused, thus there is a border around them having image data values ranging from values of 5 to 7, resulting from the blurred region between the background and the stop sign 202 and post 204.

Exemplary focus measures, in this case gradient magnitudes, for the image data of FIG. 8A are shown in the matrix of FIG. 8B. Because the matrix of FIG. 8B was calculated using convolution kernels (the Sobel operators described above), the outer matrix locations, including columns A 224 and P 226 and rows one 230 and sixteen 232, are left blank. Each calculated focus measure in the matrix of FIG. 8B is based on the eight pixels surrounding the location of the calculated focus measure in the image data of FIG. 8A. For the outer locations in the matrix of FIG. 8B there are no surrounding pixels on some sides, so focus measures are not calculated for the outer matrix locations. Various methods exist for calculating focus measures for these matrix locations, but they are not important to the present discussion of reducing field of focus in an electronic imaging device during passive autofocusing.

Note that the edge detecting autofocusing technique employed by the exemplary embodiment results in low focus measures (e.g., zero) in areas where no edges appear such as the background 222 and the interior of the area 220 containing the stop sign 202 and post 204. Higher focus measures (e.g., from one to 256) appear at the edges of the stop sign 202 and post 204. The resulting overall gradient magnitude or focus measure for the entire image of FIG. 8A is 5859.

A second sample of the image is captured at a second focus setting, with the exemplary image data shown in the matrix of FIG. 8C. The stop sign 202 and post 204 again have image data ranging from values of 13 to 19, and the background again has image data ranging from values of 1 to 3. In this sample, however, the image is more sharply focused so there is no blurred border between the background 22 and the stop sign 202 and post 204. Therefore, the focus measures shown in the matrix of FIG. 8D calculated from the image data of FIG. 8C indicate sharper edges. Note that although the range of focus measure values is about the same, ranging from one to 264 for the stop sign 202 and post 204, there are more focus measures having a large magnitude (e.g., a magnitude over 100). The overall gradient magnitude or focus measure for the entire image of FIG. 8C is 7558, indicating that it is more sharply focused than that of FIG. 8A (7558>5859).

The differential focus measures for the images of FIGS. 8A and 8C are shown in the matrix of FIG. 8E. These are calculated by taking the absolute value of the difference between the focus measures of FIGS. 8B and 8D. The differential focus measures greater than zero indicate the pixels that were affected by the change of focus settings between the first and second images shown in FIGS. 8A and 8C. As discussed above, regions may be selected based on these affected pixels in various manners.

The matrix of FIG. 8F illustrates field of focus reduction by the selection of a focus region having a regular shape. The image is divided into four quadrants, an upper left 250, upper right 252, lower left 254 and lower right 256. The differential focus measure is calculated for each of the four quadrants 250, 252, 254 and 256. The differential focus measure is 375 for the upper left quadrant 250, 536 for the upper right quadrant 252, 516 for the lower left quadrant 254, and 1715 for the lower right quadrant 256. Thus, as expected, the lower right quadrant 256, containing the majority of the pixels on the edge of the stop sign 202 and post 204, has the highest differential focus measure. The lower right quadrant 256 will therefore probably be selected as the focus region for use in subsequent samples, depending upon other factors such as whether the lower right quadrant 256 is in an area of interest, etc.

The matrix of FIG. 8G illustrates field of focus reduction by the selection of a focus region having an irregular shape. In this example, a threshold percentage of 50 percent is used. Pixels having a differential focus measure greater than 50 percent of the maximum differential focus measure in the image will be included in the irregular focus region. As the maximum differential focus measure is 143, the 50 percent level is 71.5. Thus, pixels having a differential focus measure of 72 or greater will be selected. (These are shown in the matrix of FIG. 8G with highlighted borders 260.) Note that in this exemplary image with only 256 total pixels, the irregular focus region contains disconnected portions. In actual images having much greater numbers of pixels, it is more likely that the irregular focus regions would contain larger contiguous blocks of selected pixels. However, as mentioned above, portions of the irregular focus regions may be selected as desired to simplify reading image data from the photodetector 80 and to manage calculations in the passive autofocus algorithm.

Figure 9:
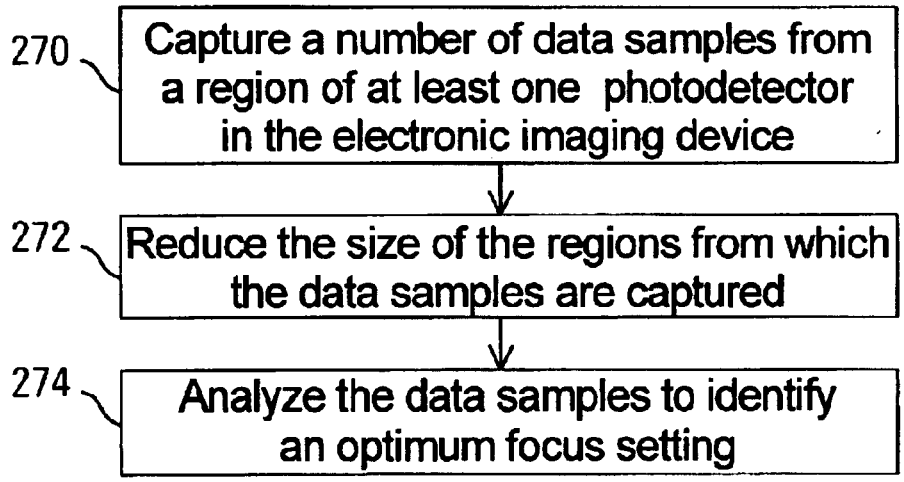
FIG. 9 is a flow chart of an exemplary operation for focusing an electronic imaging device.

Referring now to FIG. 9, the autofocus operation in the electronic imaging device, including reducing the field of focus, will be summarized. A number of data samples are captured 270 from a region of at least one photodetector in the electronic imaging device. Focus settings are changed in the electronic imaging device as the data samples are captured 270. The size of the region from which the data samples are captured is reduced 272 while the data samples are being captured. The region size may be repeatedly reduced 270 if desired. The data samples are analyzed 274 to identify an optimum focus setting. As described above, this process continues until the optimum focus setting is identified. It is to be understood that any blocks or process steps in the flow chart of FIG. 9 may represent modules, segments, or blocks of code or electronic hardware that include one or more executable instructions for implementing specific logical functions or steps in the process. It is important to note that although particular exemplary steps are described, alternative embodiments are possible. For example, steps may be executed in an order different from that shown, including partly or fully concurrently, depending on the desired functionality.

The automatic focusing process in the electronic imaging device may thus be dramatically faster than by conventional autofocus algorithms by reducing the field of focus of data samples used in the focusing process, without greatly increasing memory requirements or adding complex hardware to the electronic imaging device.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of focusing an electronic imaging device, comprising:

capturing a plurality of data samples from at least one region of at least one photodetector in said electronic imaging device while changing focus settings in said electronic imaging device;

reducing a size of said at least one region from which said data samples are captured while said plurality of data samples are being captured, wherein said size of said at least one region is reduced by comparing at least two of said plurality of data samples to identify a plurality of pixels which are affected by focus changes, and selecting at least one smaller region that includes a majority of said plurality of pixels; and analyzing said plurality of data samples to identify an optimum focus setting.

2. The method of claim 1, wherein said at least one region of said at least one photodetector comprises an entire output of said at least one photodetector for a first two of said plurality of data samples.

3. The method of claim 1, wherein said size of said at least one region is reduced by:

calculating focus measures for two sequential instances of said plurality of data samples;

comparing said focus measures to identify regions in which said focus measures most changed due to said changing focus settings; and selecting at least one smaller region at least partially containing said regions in which said focus measures most changed.

4. The method of claim 1, wherein reducing said size of said at least one region comprises selecting at least one smaller region from said at least one region.

5. The method of claim 4, wherein said reducing is performed repeatedly to form successively smaller regions during said focusing.

6. The method of claim 4, wherein selecting said at least one smaller region comprises selecting from among a plurality of smaller regions which are affected by focus changes, and wherein said at least one smaller region is partly based on its location in said at least one photodetector.

7. The method of claim 1, wherein said at least one region comprises a rectangle.

8. The method of claim 1, wherein selection of said at least one region is partly based on user configuration of said electronic imaging device.

9. The method of claim 1, wherein capturing said plurality of data samples from said at least one region comprises capturing image data for said at least one region only from said at least one photodetector.

10. The method of claim 1, wherein capturing said plurality of data samples from said at least one region comprises capturing an entire image data output from said at least one photodetector and discarding any image data outside said at least one region.

11. The method of claim 1, wherein capturing an entire image data output of said at least one photodetector comprises capturing image data outputs of a plurality of adjacent photodetectors and combining said plurality of adjacent photodetector image data outputs to form said entire image data output.

12. A method of focusing an electronic imaging device, comprising:

capturing a plurality of data samples from at least one region of at least one photodetector in said electronic imaging device while changing focus settings in said electronic imaging device;

reducing a size of said at least one region from which said data samples are captured while said plurality of data samples are being captured, wherein boundaries of said at least one region are determined based upon which pixels in at least one previous larger region are most affected by focus changes; and analyzing said plurality of data samples to identify an optimum focus setting.

13. A method of focusing an electronic imaging device, comprising:

capturing a plurality of data samples from at least one region of at least one photodetector in said electronic imaging device while changing focus settings in said electronic imaging device, wherein each of said plurality of data samples is captured at a different focus setting;

reducing a size of said at least one region from which said data samples are captured while said plurality of data samples are being captured; and analyzing said plurality of data samples to identify an optimum focus setting.

14. An electronic imaging device, comprising:

at least one photodetector;

an adjustable-focus lens assembly;

a control system connected to said photodetector and adjustable-focus lens assembly, said control system having instructions for focusing said adjustable-focus lens assembly, said instructions comprising:

instructions for changing a focus setting of said adjustable-focus lens assembly while capturing data samples from said at least one photodetector;

instructions for reducing sizes of regions from which said data samples are captured later during said focusing; and instructions for analyzing said data samples to identify an optimum focus setting.

15. The electronic imaging device of claim 14, wherein said at least one photodetector comprises a randomly accessible optical sensor.

16. The electronic imaging device of claim 15, wherein said randomly accessible sensor comprises a single complementary metal-oxide semiconductor sensor.

17. The electronic imaging device of claim 14, wherein said at least one photodetector comprises a serially accessible sensor, and wherein said instructions for capturing data samples comprise capturing entire image samples from said photodetector and discarding image data outside said regions.

18. The electronic imaging device of claim 14, wherein said at least one photodetector comprises a plurality of adjacent photodetectors whose outputs combine to form a single image.

19. The electronic imaging device of claim 14, wherein said control system comprises a processor and a memory, said instructions being stored in said memory.

20. The electronic imaging device of claim 14, wherein said control system comprises an electronic circuit, said instructions being hard-coded in said electronic circuit.

21. The electronic imaging device of claim 14, wherein said instructions for reducing said sizes of said regions comprise instructions for identifying portions of previous said data samples that are most affected by focus changes, and instructions for selecting a region containing at least some of said portions, wherein said region is smaller than a previous region.

22. The electronic imaging device of claim 14, wherein said instructions for reducing said sizes of said regions comprise instructions for recursively selecting a smaller region from a previous larger region.

23. The electronic imaging device of claim 14, wherein said instructions for reducing said sizes of said regions comprise instructions for selecting rectangular regions.

24. The electronic imaging device of claim 14, wherein said instructions for reducing said sizes of said regions comprise instructions for selecting regions whose boundaries are determined based upon which pixels in previous regions are most affected by focus changes.

* * * * *